United States Patent Office 2,749,279
Patented June 5, 1956

2,749,279

ENZYMATIC PRODUCTION OF L-GLUTAMIC ACID

Carl V. Smythe, Moorestown, N. J., and Hsing T. Huang, Elkins Park, Pa., assignors to Rohm & Haas Company, Philadelphia, Pa., a corporation of Delaware No Drawing. Application May 27, 1954,
Serial No. 432,906

7 Claims. (Cl. 195—30)

This invention relates to a process for producing glutamic acid and derivatives thereof in the form of the L-isomer exclusively. It deals with a process wherein alpha-ketoglutaric acid and ammonia are treated with a biological catalyst which includes at least one enzyme and at least one coenzyme. The enzyme is specific with respect to the reactants and the coenzyme. The coenzyme becomes oxidized and is then regenerated in an accompanying reaction.

Production of L-glutamic acid occurs in living systems and many naturally occurring proteins contain appreciable quantities of it. To isolate glutamic acid from protein, the protein is hydrolyzed and glutamic acid is separated from the other amino acids which are liberated by the hydrolysis. While chemical synthesis has been applied to the preparation of glutamic acid, the product obtained is always the DL-form and it is necessary to subject the product to separation processes which are difficult and expensive in order to provide L-glutamic acid. It is known that L-glutamic acid can be prepared by transamination, which comprises the enzymatic transfer of the amino group of some amino acid other than glutamic to alpha-ketoglutaric acid. The necessity for the other amino acid makes this method impractical. There is no known practical method for preparing L-glutamic acid from alpha-ketoglutaric acid and ammonia.

Our process comprises treating an aqueous solution having a pH of 6 to 8.5 and containing alpha-ketoglutarate and ammonium ions with a biological catalyst which comprises one or more enzymes and a coenzyme for converting alpha-ketoglutarate ions to L-glutamate ions and also a hydrogen-donating reactant for reducing the oxidized coenzyme. The hydrogen-donating reactant can be any acceptable chemical substance that is capable of reducing the oxidized coenzyme. It can act directly or chemically or it may have to be catalyzed by an enzyme system, conveniently termed a dehydrogenase system, which is specific to the hydrogen-donating reactant. If the hydrogen-donating reactant requires activation by enzyme, its specific dehydrogenase system must also be present in the reaction medium. The conversion proceeds at a temperature between about 20° and about 45° C. The conversion can be continued until all of the alpha-ketoglutarate content is consumed, there being present only a small proportion of the biological catalyst. The L-glutamate formed is recovered from the solution, most conveniently in the form of L-glutamic acid.

It should be noted that as described above the process involves essentially the coupling of the reductive amination of alpha-ketoglutarate to the oxidation of the hydrogen-donating reactant. The function of the coenzyme is purely that of a hydrogen carrier which effectively transfers hydrogen from one reaction to the other. The biological catalyst for the reductive amination of alpha-ketoglutarate can be defined by its ability to oxidize L-glutamic acid to alpha-iminoglutaric acid in the presence of the oxidized coenzyme which serves as hydrogen acceptor. Similarly, the suitable dehydrogenase system required can be defined by its ability to oxidize its substrate using the oxidized coenzyme as hydrogen acceptor. The amination reaction is strictly reversible and the present invention obviously requires that it run predominatly to the glutamic acid side. Thermodynamic data indicate that the equilibrium in a system containing alpha-ketoglutarate ions, ammonium ions, and reduced coenzyme in the presence of the necessary catalyst and under our conditions in strongly in favor of glutamic acid formation. However, for the overall catalytic reaction to operate efficiently under anaerobic conditions, the process for reducing the coenzyme must require less energy than the reductive amination reaction produces. The greater the net overall decrease in free energy, the better the catalytic reaction proceeds. Obviously this requirement places some limitation on the choice of hydrogen-donating reactants. It has been found that the alpha-ketoglutarate itself can serve as the hydrogen-donating reactant in the presence of the required dehydrogenase system to return the oxidized coenzyme to the form in which it can act reductively under the influence of the biological catalyst to promote L-glutamate formation. When alpha-ketoglutarate ions are thus used, they are oxidized and may eventually be changed to pyruvate.

It is more economical, however, to supply a second or separate hydrogen-donating reactant which can be oxidized in situ with concurrent reduction of the oxidized coenzyme. Particularly suitable for this purpose are citric acid, succinic acid, malic acid, formic acid, ethanol, propanol, glucose, glucose-6-phosphate, or other water-soluble reactants oxidizable under the stated conditions and meeting the stated energy requirements, each with its appropriate dehydrogenase system. The added hydrogen-donating reactant may be used at concentrations from 0.01 to about 0.1 molar.

The presence in crude extracts of suitable enzymes for the reductive amination reaction can be demonstrated by the common test involving reduction of methylene blue using glutamic acid as the substrate. The test may also comprise other estimations such as that of ammonia and/or ketoglutaric acid which result from the theoretical iminoglutaric acid as an intermediate. Similarly, the presence of suitable dehydrogenating enzymes for other proposed hydrogen donators may be demonstrated with methylene blue using the specific donator in question as substrate and may be confirmed by chemical tests for the oxidized product. In most cases the energetics of the oxidation can be calculated from data available in the biochemical literature. The coenzyme can be one of the known nicotinic acid-containing coenzymes.

The biological catalysts may be obtained from animal tissues, for example, from heart, liver, or kidney. They may be obtained therefrom, for example, by the aqueous extracting of an acetone dried preparation of comminuted tissue. The extract itself may be added to the ketoglutarate solution or a concentrate prepared therefrom may be so added.

Another source of the required enzymes is plant tissue from such rapidly growing plants as rhubarb, the leaves of which yield on extraction enzymes meeting the required tests, or from leguminous seedlings, the sprouted seeds of such plants as soya bean, pea, pumpkin, or cucumber being sliced and extracted with water.

The required enzyme systems can also be obtained from bacteria. Enzymes meeting the required tests are elaborated, for example, by bacteria of the genus Pseudomonas or of the genus Xanthomonas. Typical bacteria are *Pseudomonas fluorescens, fragii, aeruginosa, ovalis, putida, schuylkilliensis,* or *mildenbergii,* or *Xanthomonas citri, begoniae,* or *hyacinthi,* also *Escherichia freundii* or *coli.* Autolysates of the cell cultures or extracts of the active ferments therefrom are used.

The required catalytic system can also be obtained from various fungi, including *Aspergillus niger, aureus,* or *wentii,* or *Neurospora crassa,* or *Botrytis cinerea,* or *Penicillium glaucum.* Likewise, the desired enzymes are elaborated by yeasts, typical of which are *Torula cremoris, Torulopsis utilis, Saccharomyces fragilis,* or *Saccharomyces cerevisiae.* Here, as is common practice, the organism is grown on a culture favorable for developing the desired activity in a high degree.

Cells may be lysed by conventional methods, including sonic vibrations or treatment with an organic solvent such as toluene or ethyl acetate. As is known, dried cells may be ground with an abrasive material.

It has been found that in many cases a crude enzyme preparation from one source would contain sufficient amounts of all the enzymes needed to act as a complete catalytic agent. On the other hand it is possible that a preparation of a highly active glutamate oxidizing system from one source may be relatively deficient in a desired dehydrogenase system. It will then be advantageous to supplement the glutamate oxidizing system with a preparation of the desired dehydrogenase system from another source.

In the enzyme systems which are elaborated by the above mentioned organisms or present in enzyme systems obtained from plant or animal tissues there occurs to a greater or less extent the type of coenzyme required in the reductive amination of alpha-ketoglutaric acid. In some enzyme preparations there is sufficient coenzyme to carry on the desired changes at a favorable rate, particularly as in the enzyme systems elaborated by yeasts. In some cases addition of coenzyme is desirable. Commercial preparations, for example, from liver or from yeast provide material which may be added to the reaction mixture in an amount proportioned to the other enzymes. The action of coenzymes in the enzyme systems may be improved by addition thereto of nicotinamide.

There may also be added compounds containing elements or groups which are known to improve or accelerate the action of enzymes, such as magnesium or trace elements. Of course, the presence of such elements and groups is often provided by the tissues or culture media from which they are prepared. But actual addition may be made to the reaction mixture.

The alpha-ketoglutarate solution may be prepared from alpha-ketoglutaric acid or from a water-soluble salt thereof or from a mixture of acid and such salt. The concentration of alpha-ketoglutarate is between 0.01 and 0.5 molar. The source of alpha-ketoglutarate is unimportant. There may be synthesized alpha-ketoglutaric acid; alpha-ketoglutaric acid may be isolated from natural materials; it may be formed by fermentation, as by the submerged culture of bacteria in a nutrient medium containing glucose; it may be formed by conversion of alpha-ketogluconic acid; or it may be formed by the action of enzymes on carbohydrates or such acids as citric acid. The alpha-ketoglutaric acid values need not be separated from an aqueous solution in which they are formed. Often the solution in which alpha-ketoglutaric acid or the salt thereof is formed is quite suitable for use in the process of this invention.

In conjunction with the alpha-ketoglutaric acid values there is used ammonia, ammonium hydroxide, or an ammonium salt, such as ammonium chloride, sulfate, or phosphate. The ammonium ions in the solution should preferably be at least proportional to the ketoglutarate ions to be converted to glutamate.

The solution should be brought to a pH from 6 to 8.5. This can be done by adjusting the proportions of ketoglutarate and ammonia or ammonium ions or by buffering with alkali metal phosphates or an amine salt, such as tris(hydroxymethyl)methylamine hydrochloride.

The aqueous solution containing alpha-ketoglutarate and ammonium ions without or, preferably, with a separate reactant for regenerating oxidized coenzyme, enzymes for aminating the ketoglutarate, as well as for oxidizing the compound used to reduce the coenzyme, if such are required, and a coenzyme is maintained between 20° and 45° C. for a period of time, usually from 24 to 96 hours, until the desired conversion is well advanced. The time required will depend on temperature, concentration of reactants, and activity of the enzymes and the coenzyme.

The reacted solution contains L-glutamate ions associated with sodium, potassium, or ammonium ions, enzymes, cells, coenzyme, oxidation products of the hydrogen-donating reactant, usually protein matter, and the like. The reaction mixture is usually heated to coagulate proteins, conveniently after acidification. The pH is adjusted to about 3, a value of 3.1 being best, this being the isoelectric point of the glutamic acid. The solution is centrifuged or filtered and the clear liquor is evaporated to a small volume. Crystals of L-glutamic acid form and are separated.

The isolation of this product may also be effected with the aid of ion-exchange resins. A sulfonic cation exchanger in hydrogen form, such as a sulfonated cross-linked polystyrene or a sulfonated phenol-formaldehyde resin, is brought in contact with the clarified solution. This is most conveniently done by passing the solution through a column of the acid resin. The resin is then eluted, as with a dilute hydrochloric acid solution. The eluate is concentrated or evaporated to dryness. The concentrate or an aqueous solution of the residue from evaporation is adjusted to about pH 3, usually by addition of an ammonium hydroxide solution, and L-glutamic acid is crystallized out.

Additional details of procedures are given in the following illustrative examples, wherein parts are by weight unless otherwise designated.

*Example 1*

(a) A solution was made from 4.0 parts of sodium citrate, $Na_3C_6H_5O_7.5½H_2O$, 0.24 part of ammonium citrate, 0.11 part of potassium dihydrogen phosphate, 0.024 part of magnesium sulfate, $MgSO_4.7H_2O$, ferrous ammonium sulfate to give one part per million of iron, and water, the volume of the solution being adjusted with water to 100 parts. This solution was sterilized and inoculated with a pure culture of *Pseudomonas fluorescens*. The inoculated growth medium was incubated at 30° C., while it was stirred with a steady stream of a mixture of air and carbon dioxide. After 22 hours the cells were harvested and washed well with cold physiologically normal saline solution. A suspension of these cells when shaken in a solution containing α-ketoglutarate or L-glutamate at pH 7.0 in 0.05 M phosphate buffer was found to effect rapid uptake of oxygen. An aqueous suspension of cells was prepared and 35 parts thereof containing 0.55 mg. of cell nitrogen per ml. was treated in an ultrasonic vibrator at 6° C. at 10,000 cycles per second for eight minutes.

(b) A portion of 30 ml. of the resulting homogenate was mixed with 20 ml. of 0.2 M diammonium α-ketoglutarate, 14 mg. of coenzyme concentrate from pork liver, 10 ml. of 0.25 M tris(hydroxymethyl)aminomethane-hydrochloric acid buffer solution at pH 8.0, and 20 ml. of water. The vessel containing this reaction mixture was flushed thoroughly with nitrogen, tightly stoppered, and gently shaken at 30° C. for 24 hours. The reaction mixture was then heated at 120° C. in an autoclave for two minutes to stop the reaction. The reaction mixture was cooled. The coagulated cellular material was separated by centrifuging. The clear supernatant was found by microbiological assay to contain 20 micromoles per ml. of L-glutamic acid. Chemical analysis showed that 56% of the α-ketoglutarate taken had been utilized and 25% of the α-ketoglutarate consumed was accounted for as pyruvate.

The supernatant was then passed through a column of sulfonated phenol-formaldehyde ion-exchange resin in hydrogen form. The resin eluted with 1 N hydrochloric acid solution until the eluate was free from material which reacted with minhydrin. The eluate was evaporated under low pressure to dryness. The resulting residue was taken up in a small volume of water. The pH of the solution was adjusted with ammonia to a value of 3.1. This solution was stored for about 16 hours in a refrigerator. Crystals of L-glutamic acid formed and were collected. The product was recrystallized. It melted at 187°–188° C. A mixed melting point with an authentic sample of L-glutamic acid showed no depression. In 5 N hydrochloric acid the product at 1% had a value of $[\alpha]_D^{25}$ of −31.5.

*Example 2*

A paste of 16 grams of baker's yeast, *Saccharomyces cerevisae*, in 10 ml. of water was treated in an ultrasonic vibrator at 10,000 cycles per second for 20 minutes at 6° C. The resulting autolysate was mixed with 50 ml. of 0.10 M diammonium alpha-ketoglutarate, 20 ml. of 0.2 M sodium phosphate buffer solution at pH 7.0, 20 mg. of nicotinamide, and 16 ml. of water. The reaction vessel cnotaining this mixture was flushed with nitrogen and closed. The mixture was agitated gently for 24 hours at 30° C. and then heated in an autoclave at 120° C. and 15 lbs. p. s. i. for three minutes. It was cooled to 4° C. and held at this temperature for two hours. The coagulated material contained in the thus treated mixture was removed by centrifuging. The clear supernatant was analyzed for L-glutamate, alpha-ketoglutarate, and pyruvate. A control sample prepared by mixing the same reactants, except that alpha-ketoglutarate was omitted, agitating this mixture for 24 hours, heating the mixture in the autoclave under the above conditions, and centrifuging, was analyzed for the same materials. From the microbiological assay there was found synthesized 16 micromoles per ml. of L-glutamic acid in the incubated mixture. Chemical determinations showed 50% of the original alpha-ketoglutaric acid had been consumed and 25% of the consumed alpha-ketoglutarate had been converted to pyruvate.

In the same way there may be used other biological catalysts which are capable of oxidizing L-glutamic acid to alpha-iminoglutaric acid. In the case of solutions containing only ketoglutarate as both the primary reactant forming L-glutamic acid and the secondary reactant being oxidized while the coenzyme hydrogen donor is reduced, one fourth of the ketoglutarate consumed enters into this secondary reaction. This is not necessary, however, and in fact it is more economical to supply other secondary reactants, as shown above.

*Example 3*

A strain of *Pseudomonas fluorescens* was grown in a citrate medium as described in Example 1. After 24 hours the cells were harvested as before and washed with physiologically normal saline solution. A portion of 35 ml. of a suspension of the cells in water containing about 0.6 mg. of nitrogen per ml. was treated in an ultrasonic vibrator at 5° C. at 10,000 cycles per second for 10 minutes.

A portion of 30 ml. of this homogenate was mixed with 10 ml. of 0.2 M diammonium alpha-ketoglutarate solution, 10 ml. of 0.2 M diammonium sodium citrate solution, 10 mg. of a coenzyme preparation from beef liver, 10 ml. of 0.25 M tris(hydroxymethyl)aminomethane hydrochloride buffer solution at pH 8.0, and 20 ml. of water. This mixture was blanketed with nitrogen and agitated at 30° C. for 24 hours. The reaction was stopped by heating to 120° C. in an autoclave for one minute. The coagulated cellular material was separated by centrifuging. The clear solution was concentrated under reduced pressure, adjusted to pH 3.1, and chilled in a refrigerator. Crystals formed. These were identified as L-glutamic acid, as above.

In the same way enzyme systems elaborated by *Xanthomonas citri, begonaie, vasculorum*, or other species may be utilized with conversion of alpha-ketoglutarate and ammonia to L-glutamate. In place of the enzyme systems developed by various bacteria there may similarly be used enzyme systems discussed above from other kinds of living material.

In the process of this invention a biological catalyst which includes coenzyme, which is capable of oxidizing L-glutamic acid to alpha-iminoglutaric acid, and which has the ability to convert alpha-ketoglutarate and ammonium ions to L-glutamic acid values is allowed to act at 20° to 45° C. upon an aqueous solution containing alpha-ketoglutarate and ammonium ions at a pH of 6 to 8.5, whereby L-glutamate ions are formed in the solution and at the same time coenzyme is oxidized. The presence of a water-soluble hydrogen-donating reactant in the solution, be it alpha-ketoglutarate with its dehydrogenase or added oxidizable reactant, with its dehydrogenase, if such be required, serves to reduce the oxidized coenzyme and thus continue the action of the biological catalyst on the alpha-ketoglutarate content of the solution.

The process of this invention has many novel and advantageous aspects. The reaction occurs under mild conditions of temperature, pressure, and pH. It utilizes readily available materials, inasmuch as alpha-ketoglutaric acid may be produced in a number of ways, including synthesis and fermentation of cheap materials (cf. U. S. 2,277,716), ammonia and ammonium salts are cheap and abundant, the biological catalysts for the reductive amination reaction and the concurrent regeneration of reduced coenzyme can be obtained from many sources, the coenzyme needed only in small amounts is widely distributed in nature and available commercially, and materials for rehydrogenating the coferment are readily available. Some microorganisms, such as yeasts and *Pseudomonas fluorescens*, contain all the catalytic components required. Thus living catalysts for L-glutamic acid production are available. While alpha-ketoglutaric acid or its ammonium salt may be separately prepared or synthesized, isolated, and used to make up the starting solution of the process of this invention, alpha-ketoglutaric acid may be prepared in solution and when this solution is adjusted to proper concentration and pH and treated with the biological catalyst, L-glutamic acid is obtained in a simple and efficient manner.

We claim:

1. A process for preparing L-glutamic acid which comprises treating between 20° and 45° C. an aqueous solution having a pH of 6.0 to 8.5, containing alpha-ketoglutarate ions and ammonium ions with a biological catalytic system selected from at least one member of the group consisting of extracts from heart, liver, and kidney, bacteria of the genus Xanthomonas, bacteria of the genus Pseudomonas, lysed fungi of *Aspergillus niger, Aspergillus aureus* and *Aspergillus wentii*, of *Neurospora crassa*, and of *Botrytis cinerea*, of *Penicillium glaucum*, lysed yeasts of *Torula cremoris*, of *Torulopsis utilis*, of *Saccharomyces fragilis* and *Saccharomyces cerevisiae* and with a water-soluble hydrogen-donating reactant selected from at least one member of the group consisting of citric acid, malic acid, and glucose-6-phosphate and a dehydrogenase system specific for said reactant, said biological catalytic system containing a reversibly oxidizable and reducible nicotinic acid-containing coenzyme, and said biological catalytic system being identified by its capacity to oxidize L-glutamic acid to alphaiminoglutaric acid in the presence of the oxidized coenzyme and by its capacity to reduce methylene blue using glutamic acid as substrate, and the specific dehydrogenase system being defined by its ability to oxidize its reactant using the coenzyme as hydrogen acceptor and by its capacity to reduce methylene blue using the specific hydrogen-donating reactant as substrate, whereby L-glutamate ions are formed in the solution.

2. A process for preparing L-glutamic acid which comprises treating between 20° and 45° C. an aqueous solution having a pH of 6.0 to 8.5, containing 0.01 to 0.5 molar concentration of alpha-ketoglutarate ions, and containing ammonium ions at least molecularly proportional to the alpha-ketoglutarate ions, with a biological catalytic system selected from at least one member of the group consisting of extracts from heart, liver, and kidney, bacteria of the genus Xanthomonas, bacteria of the genus Pseudomonas, lysed fungi of *Aspergillus niger, Aspergillus aureus* and *Aspergillus wentii*, of *Neurospora crassa*, and of *Botrytis cinerea*, of *Penicillium glaucum*, lysed yeasts of *Torula cremoris*, or *Torulopsis utilis*, of *Saccharomyces fragilis* and *Saccharomyces cerevisiae* and with a water-soluble hydrogen-donating reactant selected from at least one member of the group consisting of citric acid, malic acid, and glucose-6-phosphate and a dehydrogenase system specific for said reactant, said biological catalytic system containing a reversibly oxidizable and reducible nicotinic acid-containing coenzyme, and said biological catalytic system being identified by its capacity to oxidize L-glutamic acid to alpha-iminoglutaric acid in the presence of the oxidized coenzyme and by its capacity to reduce methylene blue using glutamic acid as substrate, and the specific dehydrogenase system being defined by its ability to oxidize its reactant using the coenzyme as hydrogen acceptor and by its capacity to reduce methylene blue using the specific hydrogen-donating reactant as substrate, whereby L-glutamate ions are formed in the solution.

3. The process of claim 2, in which the biological catalytic system is derived from the bacterium *Pseudomonas fluorescens*.

4. The process of claim 3, in which the water-soluble hydrogen-donating reactant is supplied by citric acid.

5. The process of claim 2, in which the biological catalytic system is derived from the yeast *Saccharomyces cerevisiae*.

6. The process of claim 5, in which the water-soluble hydrogen-donating reactant is supplied by citric acid.

7. The process of claim 6, in which nicotinamide is added to the solution.

References Cited in the file of this patent

Chemical Abstract 32:2966(9); 37:4412(2).

Annual Review of Biochemistry, vol. XVIII, 1949, page 543.

Sumner et al.: The Enxymic, Academic Press, vol. 1, Part 2, 1951; pp. 1064–1065; vol. 2, Part 2, 1952 pp. 1116–1119.

Advances in Enzymology, vol. 15, 1954, Interscience Pub., 1954, New York pp. 185, 224.

Porter: Bacterial Chemistry and Physiology; Wiley, 1946, pp. 575–578.